(12) United States Patent
Shinohara et al.

(10) Patent No.: US 11,141,628 B2
(45) Date of Patent: Oct. 12, 2021

(54) GOLF BALL

(71) Applicant: BRIDGESTONE SPORTS CO.,LTD., Tokyo (JP)

(72) Inventors: Hirotaka Shinohara, Chichibu (JP); Takuichi Shimizu, Chichibu (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 17/090,890

(22) Filed: Nov. 6, 2020

(65) Prior Publication Data

US 2021/0187358 A1 Jun. 24, 2021

(30) Foreign Application Priority Data

Dec. 20, 2019 (JP) .............................. JP2019-230672

(51) Int. Cl.
*A63B 37/06* (2006.01)
*A63B 37/00* (2006.01)

(52) U.S. Cl.
CPC ...... *A63B 37/0031* (2013.01); *A63B 37/0021* (2013.01); *A63B 37/0075* (2013.01); *A63B 37/00221* (2020.08)

(58) Field of Classification Search
CPC ................................................ A63B 37/0022
USPC ....................................................... 473/378
See application file for complete search history.

(56) References Cited

U.S. PATENT DOCUMENTS

| 6,063,859 | A | * | 5/2000 | Yamamoto | ......... | A63B 37/0003 |
|---|---|---|---|---|---|---|
| | | | | | | 473/351 |
| 2010/0093468 | A1 | * | 4/2010 | Sato | ................... | A63B 37/0089 |
| | | | | | | 473/383 |
| 2016/0136484 | A1 | * | 5/2016 | Inoue | ................. | A63B 37/0031 |
| | | | | | | 473/377 |
| 2017/0173398 | A1 | * | 6/2017 | Tachibana | .......... | A63B 37/0092 |

FOREIGN PATENT DOCUMENTS

| JP | 2018512951 A | 5/2018 |
|---|---|---|
| WO | 2016167945 A1 | 10/2016 |

* cited by examiner

*Primary Examiner* — Raeann Gorden
(74) *Attorney, Agent, or Firm* — Kenja IP Law PC

(57) ABSTRACT

A golf ball wherein a slide amount Ds is 1.05 mm or less and a post-slide contact time Tc is 600 μs or more in the case where a golf ball 140 is dropped freely from a height position of 3 m above and away from a collision surface 130a inclined 58 degrees with respect to a horizontal direction to collide with the collision surface, the slide amount Ds being a vertical displacement of the golf ball from when the golf ball starts sliding on the collision surface to when the golf ball stops sliding on the collision surface, and the post-slide contact time Tc being a period from when the golf ball stops sliding on the collision surface to when the golf ball leaves the collision surface.

8 Claims, 4 Drawing Sheets

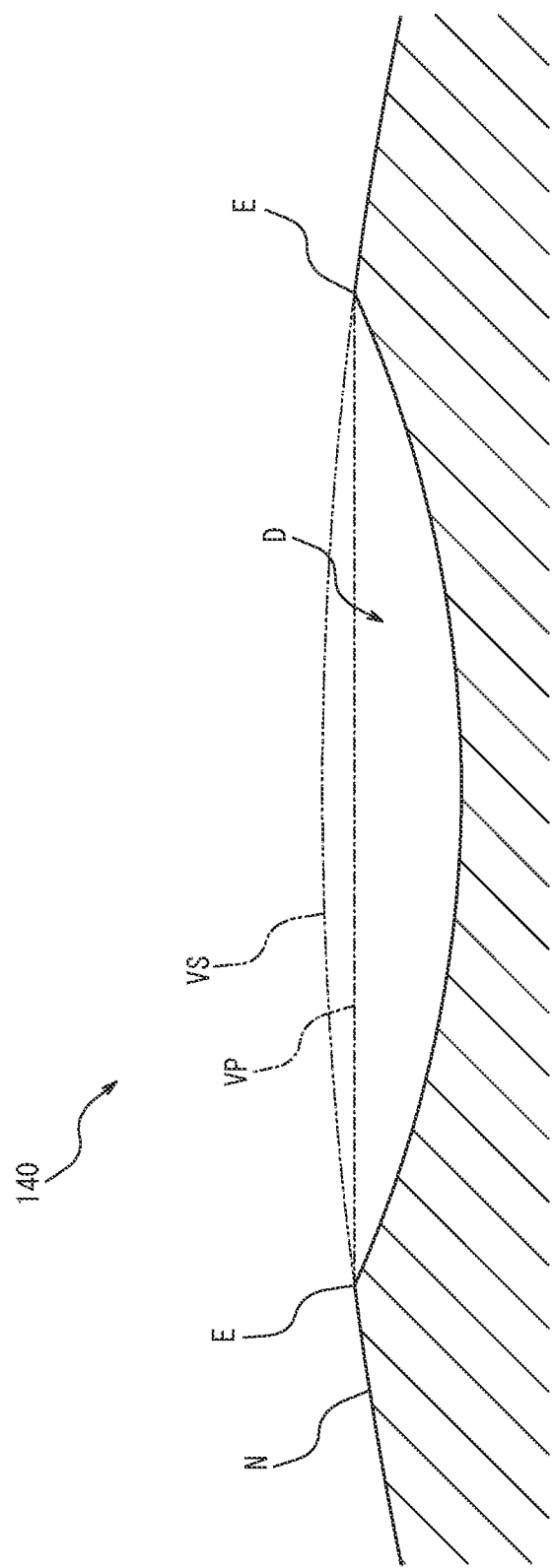

GOLF BALL

TECHNICAL FIELD

The present disclosure relates to golf balls.

This application is based on and claims priority to Japanese patent application No. 2019-230672, filed on Dec. 20, 2019, the entire content of which is incorporated herein by reference.

BACKGROUND

Golf balls for low compression and high coefficient of restitution (COR) are conventionally proposed (for example, JP 2018-512951 A (PTL 1)).

CITATION LIST

Patent Literature

PTL 1: JP 2018-512951 A

SUMMARY

However, conventional golf balls have room for improvement in golfers' feel at impact (hereinafter also referred to as "impact feel").

It would be helpful to provide a golf ball that can improve the feel at impact.

A golf ball according to the present disclosure is a golf ball wherein a slide amount Ds is 1.05 mm or less and a post-slide contact time Tc is 600 μs or more in the case where the golf ball is dropped freely from a height position of 3 m above and away from a collision surface inclined 58 degrees with respect to a horizontal direction to collide with the collision surface, the slide amount Ds being a vertical displacement of the golf ball from when the golf ball starts sliding on the collision surface to when the golf ball stops sliding on the collision surface, and the post-slide contact time Tc being a period from when the golf ball stops sliding on the collision surface to when the golf ball leaves the collision surface.

Preferably, the golf ball according to the present disclosure comprises a cover, wherein a material hardness of the cover is 46 or less in Shore D hardness.

Preferably, the golf ball according to the present disclosure comprises: a cover; and a paint film covering the cover, wherein the paint film is formed using, as a main component, urethane paint composed of a polyol that is a main agent and a polyisocyanate that is a curing agent, the polyol is polyester polyol, and the polyisocyanate contains an isocyanurate form and an adduct form of hexamethylene diisocyanate.

Preferably, in the golf ball according to the present disclosure, a mass ratio of the isocyanurate form and the adduct form of the hexamethylene diisocyanate, expressed as (isocyanurate form)/(adduct form), is 90/10 to 50/50.

Preferably, the golf ball according to the present disclosure comprises: a cover; and a paint film covering the cover, wherein a thickness of the paint film is 8.0 μm or more.

Preferably, the golf ball according to the present disclosure comprises multiple dimples on a surface thereof, wherein a dimple surface occupancy ratio SR of the golf ball is 85.0% or less.

It is thus possible to provide a golf ball that can improve the feel at impact.

BRIEF DESCRIPTION OF THE DRAWINGS

In the accompanying drawings:

FIG. 4 is an explanatory diagram for describing the dimple surface occupancy ratio of a golf ball according to one of the disclosed embodiments.

DETAILED DESCRIPTION

Figure 1:
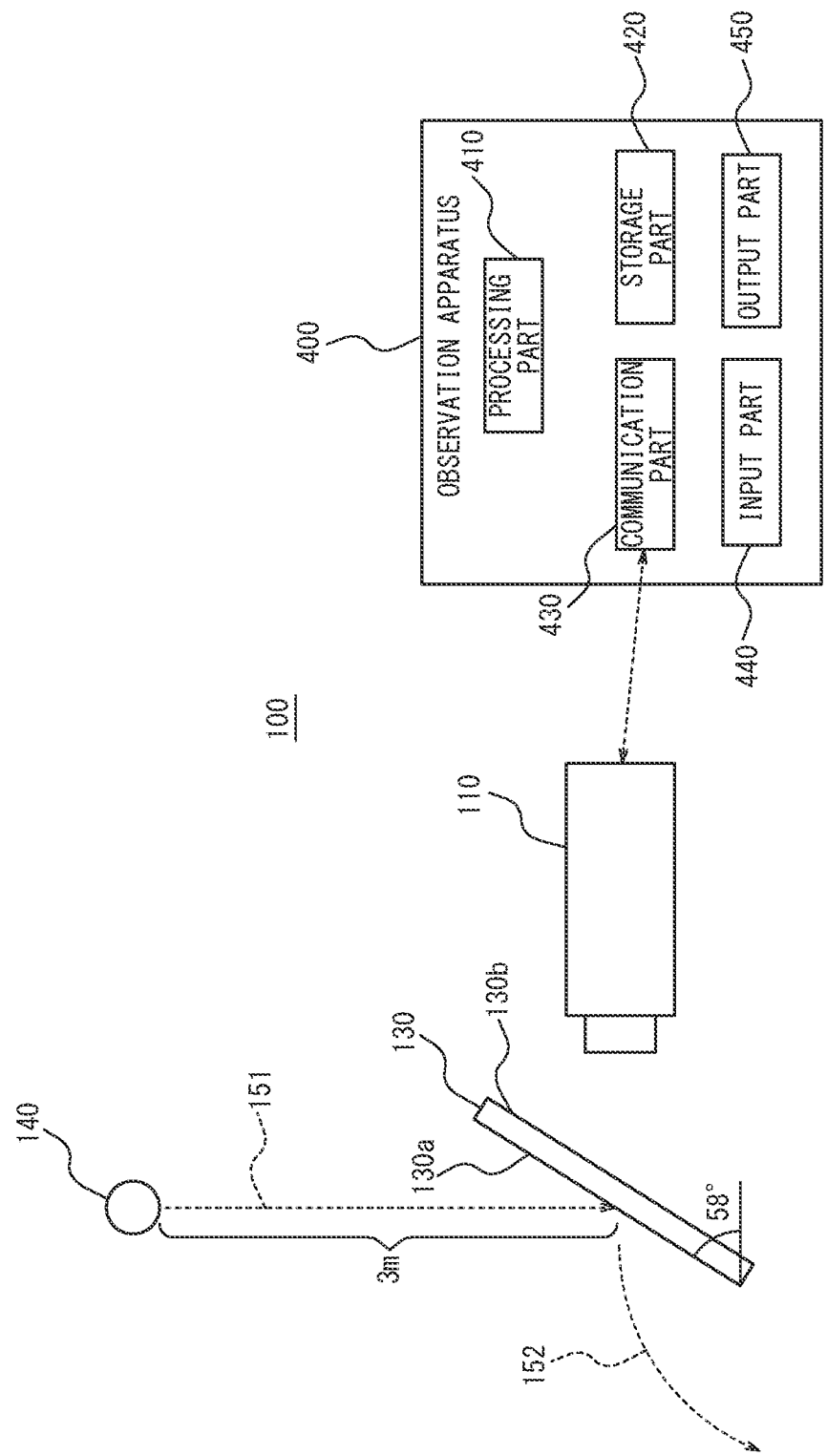
FIG. 1 is an explanatory diagram for describing a drop test and an observation system for a golf ball.

A golf ball according to one of the disclosed embodiments will be described below, with reference to FIGS. 1 to 4.

The same structural elements are given the same reference signs in the drawings.

[Characteristics of Golf Ball in Drop Test]

A golf ball 140 according to one of the disclosed embodiments is defined by the below-described slide amount Ds (FIG. 2) and post-slide contact time Tc (FIG. 2) when conducting a drop test in which the golf ball 140 is dropped freely from a height position of 3 m above and away from the below-described collision surface 130a to collide with the collision surface 130a as illustrated in FIG. 1.

The collision surface 130a is included in a collision member 130. The collision surface 130a is configured as a surface with which the golf ball 140 collides. The collision surface 130a is a flat surface and is inclined 58 degrees with respect to the horizontal direction, as illustrated in FIG. 1. In the drop test, the golf ball 140 is dropped freely from a height position of 3 m above and away from the collision surface 130a to collide with the collision surface 130a. More specifically, the height position is a position of 3 m above and away from a part of the collision surface 130a with which the golf ball 140 collides.

In the drop test, the golf ball 140 may be freely dropped manually by a person, or a predetermined dropping apparatus may be installed to automatically drop the golf ball 140 freely.

In the drop test, the golf ball 140 falling freely from the height position along a dotted arrow 151 bounces out in the direction of a dotted arrow 152 after collision with the collision surface 130a, as illustrated in FIG. 1. By this drop test, the same event as striking the golf ball 140 with the face of a golf club can be reproduced.

In the example in FIG. 1, the collision member 130 is shaped like a plate having uniform thickness throughout. However, the collision member 130 may have any other shape as long as it has the collision surface 130a.

At least the part of the collision member 130 with which the golf ball 140 collides (i.e. the part of the collision member 130 throughout its thickness including the region of the collision surface 130a which the golf ball comes into contact with at collision and then leaves) is made of acrylic glass. Preferably, the whole collision member 130 is made of acrylic glass. Since acrylic glass is transparent, such a collision member 130 allows the below-described high-speed camera 110 to image the golf ball 140 from the side of the surface 130b opposite to the collision surface 130a.

The behavior of the golf ball 140 in the case where the golf ball 140 collides with the collision surface 130a in the drop test will be described below, with reference to FIG. 2.

Figure 2:
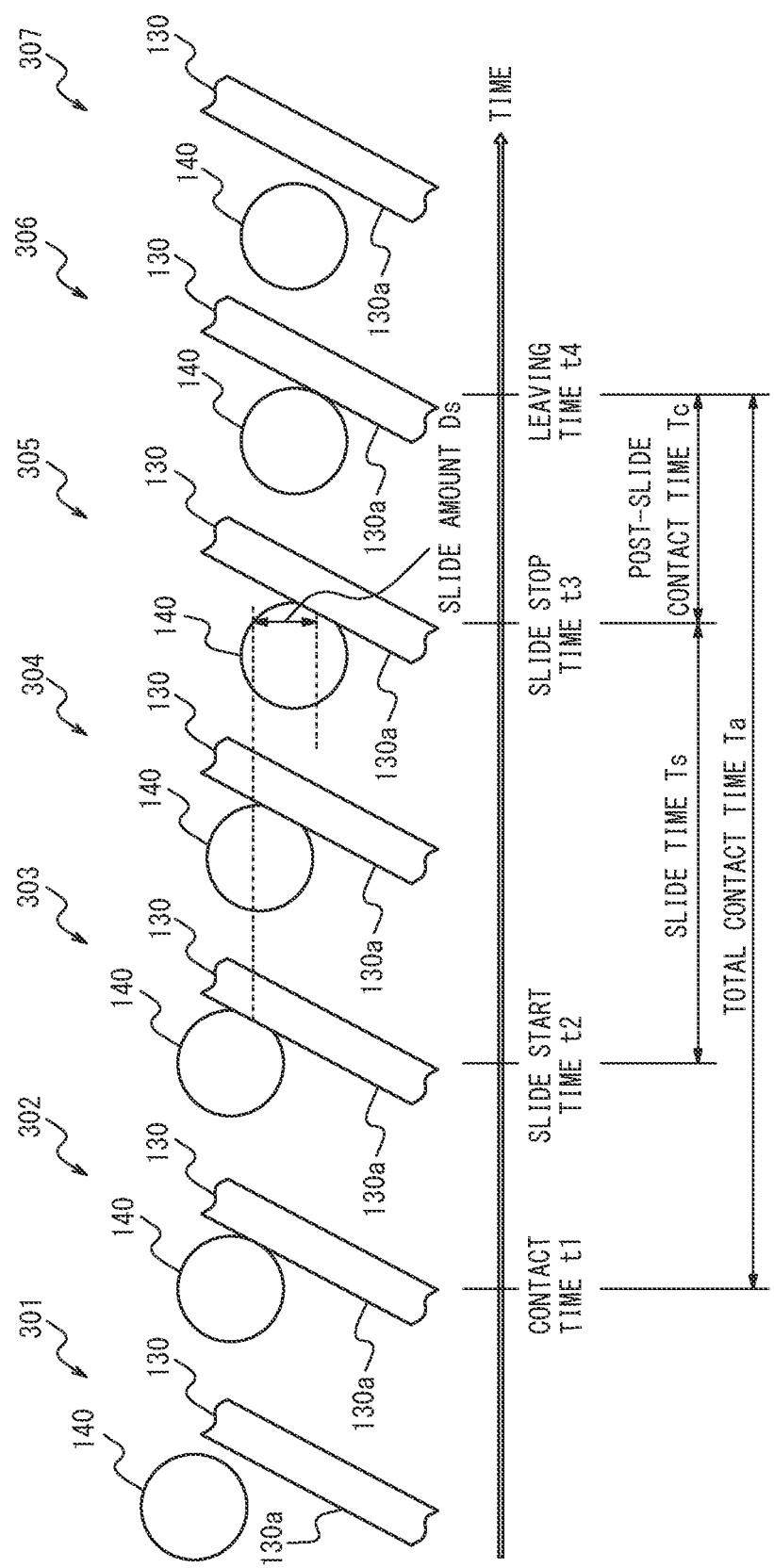
FIG. 2 is an explanatory diagram for describing the behavior of a golf ball.

In FIG. 2, the horizontal axis represents time, and states 301 to 307 are each the state of the golf ball 140 at the corresponding time. As illustrated in FIG. 2, the state of the golf ball 140 changes from state 301 to state 307 with time in the case where the golf ball 140 collides with the collision surface 130a.

In FIG. 2, state 301 is the state of the golf ball 140 before its collision with the collision surface 130a of the collision member 130.

State 302 is the state of the golf ball 140 at the instant of its contact with the collision surface 130a of the collision member 130. The time of occurrence of state 302 is hereinafter referred to as "contact time (t1)".

State 303 is the state of the golf ball 140 in which the golf ball 140 starts sliding along the collision surface 130a after the golf ball 140 is partially crushed and as a result deformed into a flat shape along the collision surface 130a. The time of occurrence of state 303 is hereinafter referred to as "slide start time (t2)".

State 304 is the state of the golf ball 140 in which the golf ball 140 as partially flattened is sliding down toward the bottom of the collision surface 130a along the collision surface 130a. The area of the flattened part (the part in contact with the collision surface 130a) of the golf ball 140 in state 304 is larger than the area of the flattened part (the part in contact with the collision surface 130a) of the golf ball 140 in state 303.

State 305 is the state of the golf ball 140 in which the golf ball 140 stops sliding while rebounding to its original shape. The time of occurrence of state 305 is hereinafter referred to as "slide stop time (t3)".

State 306 is the state of the golf ball 140 at the instant when the golf ball 140, which has completely regained its original shape, leaves the collision surface 130a. The time of occurrence of state 306 is hereinafter referred to as "leaving time (t4)".

State 307 is the state of the golf ball 140 after its leaving from the collision surface 130a.

Thus, after the golf ball 140 comes into contact with the collision surface 130a (contact time t1), the golf ball 140 is partially crushed and as a result deformed into a flat shape along the collision surface 130a, and then the golf ball 140 slides downward along the collision surface 130a (slide start time t2 to slide stop time t3). Subsequently, the golf ball 140 which has been deformed gradually regains its original shape, and the golf ball 140 leaves the collision surface 130a (leaving time t4).

Herein, the period from the contact time t1 (the instant when the golf ball 140 comes into contact with the collision surface 130a) to the leaving time t4 (the instant when the golf ball 140 leaves the collision surface 130a) is referred to as "total contact time (Ta)" (FIG. 2). That is, the total contact time Ta is the duration for which the golf ball 140 is in actual contact with the collision surface 130a.

Herein, the period from the slide start time t2 (the time at which the golf ball 140 starts sliding on the collision surface 130a) to the slide stop time t3 (the time at which the golf ball 140 stops sliding on the collision surface 130a) is referred to as "slide time (Ts)" (FIG. 2). That is, the slide time Ts is the duration for which the golf ball 140 is sliding downward on the collision surface 130a.

Herein, the vertical displacement of the golf ball 140 in the slide time Ts is referred to as "slide amount (Ds)" (FIG. 2). More specifically, the slide amount Ds can be measured as the distance in the vertical direction between a predetermined point on the golf ball 140 at the slide start time t2 and the predetermined point on the golf ball 140 at the slide stop time t3, as illustrated in FIG. 2. The predetermined point on the golf ball 140 is preferably marked with a point marker, to ease visible recognition of the predetermined point.

Herein, the period from the slide stop time t3 (the time at which the golf ball 140 stops sliding on the collision surface 130a) to the leaving time t4 (the instant when the golf ball 140 leaves the collision surface 130a) is referred to as "post-slide contact time (Tc)". That is, the post-slide contact time Tc is the duration for which the golf ball 140 remains at the same position on the collision surface 130a immediately before leaving the collision surface 130a.

The relationship between a golfer's feel at impact (impact feel) and the slide amount Ds, the slide time Ts, the post-slide contact time Tc, or the total contact time Ta will be described below.

Typically, golfers sense differences between golf balls as differences in the feel at impact, specifically as differences in the feeling of a golf ball's biting on the face of a golf club (namely, "bite feel") and the feeling of a golf ball's sticking onto the face of a golf club (namely, "sticky feel").

The bite feel that a golfer senses at the time of striking a golf ball is presumed to indicate an event in which the golf ball does not slide much on the surface of the face of a golf club when the face of the golf club impacts the golf ball. That is, it may be said that a good bite feel that a golfer senses at the time of striking a golf ball corresponds to a small slide amount Ds or a short slide time Ts. I took this point into consideration, and newly discovered that the bite feel of a golf ball at impact can be adjusted by adjusting the slide amount Ds or the slide time Ts. The slide amount Ds or the slide time Ts was not taken into consideration in the conventional techniques.

The sticky feel that a golfer senses at the time of striking a golf ball is presumed to indicate an event in which the golf ball is in contact with the face of a golf club for a long time when the face of the golf club impacts the golf ball. That is, it may be said that a good sticky feel that a golfer senses at the time of striking a golf ball corresponds to a long post-slide contact time Tc or a long total contact time Ta. Here, since the total contact time Ta includes the slide time Ts which is relevant to the bite feel, the post-slide contact time Tc can be regarded as correlating with the sticky feel more directly than the total contact time Ta. I took this point into consideration, and newly discovered that the sticky feel of a golf ball at impact can be adjusted by adjusting the post-slide contact time Tc. The post-slide contact time Tc was not taken into consideration in the conventional techniques.

The present disclosure is based on these discoveries.

The golf ball 140 according to one of the disclosed embodiments has a slide amount Ds of 1.05 mm or less, in the case where the golf ball 140 is dropped freely from the foregoing height position to collide with the collision surface 130a (hereinafter also referred to as "in the drop test"). The bite feel at impact can thus be improved.

The golf ball 140 according to one of the disclosed embodiments also has a post-slide contact time Tc of 600 μs or more in the drop test. The sticky feel at impact can thus be improved.

Hence, the golf ball 140 according to one of the disclosed embodiments can improve the bite feel and the sticky feel, and thus can improve the feel at impact (impact feel).

The golf ball 140 according to one of the disclosed embodiments is particularly suitable for use by professional golfers and advanced golfers. The golf ball 140 according to one of the disclosed embodiments is particularly suitable for use in approach shots.

In each embodiment described herein, from the viewpoint of improving the bite feel and thus the impact feel, the slide amount Ds of the golf ball 140 in the drop test is preferably 1.04 mm or less, more preferably 0.90 mm or less, further preferably 0.85 mm or less, and particularly preferably 0.80 mm or less.

From the viewpoint of improving the impact feel, the slide amount Ds of the golf ball 140 in the drop test may be 0.70 mm or more, or may be 0.75 mm or more.

In each embodiment described herein, from the viewpoint of improving the sticky feel and thus the impact feel, the post-slide contact time Tc of the golf ball 140 in the drop test is preferably 634 µs or more, more preferably 645 µs or more, further preferably 675 µs or more, and particularly preferably 690 µs or more.

The post-slide contact time Tc of the golf ball 140 in the drop test may be 750 µs or less, or may be 700 µs or less.

The slide amount Ds or the post-slide contact time Tc can be adjusted, for example, by adjusting the formulation and/or thickness of a paint film 40, a dimple surface occupancy ratio SR, the formulation and/or material hardness of a cover 30, the formulation of an intermediate layer 20, etc. in the golf ball 140. The paint film 40, the dimple surface occupancy ratio SR, the cover 30, and the intermediate layer 20 will be described later.

[Observation System]

The slide amount Ds, the slide time Ts, the post-slide contact time Tc, and the total contact time Ta of the golf ball 140 in the drop test can each be measured using the following observation system 100.

As illustrated in FIG. 1, the observation system 100 includes the collision member 130, the high-speed camera 110, and an observation apparatus 400. The observation system 100 may not include the observation apparatus 400.

As mentioned above, a predetermined point on the golf ball 140 is preferably marked with a point marker. This eases visible recognition of the predetermined point by the high-speed camera 110 or by a user who views video data provided from the high-speed camera 110. In this case, the golf ball 140 is preferably dropped freely so that the marker will come into contact with the collision surface 130a at collision with the collision surface 130a.

In this embodiment, at least the part of the collision member 130 with which the golf ball 140 collides (preferably, the whole collision member 130) is made transparent, to allow the high-speed camera 110 to image the golf ball 140 from the side of the surface 130b opposite to the collision surface 130a.

The high-speed camera 110 is configured to image how the golf ball 140 collides with the collision member 130 from the side of the surface 130b opposite to the collision surface 130a with which the golf ball 140 collides.

The high-speed camera 110 provides video data generated as a result of the imaging, to the observation apparatus 400. For example, the high-speed camera 110 may transmit the video data to the observation apparatus 400 during or after the imaging, to store the video data in the observation apparatus 400. Communication between the high-speed camera 110 and the observation apparatus 400 may be wire communication or wireless communication. Alternatively, the high-speed camera 110 may store the video data in an external storage device (e.g. SD card, USB) removable from the high-speed camera 110, and the external storage device may be connected to the observation apparatus 400 to store, in the observation apparatus 400, the video data stored in the external storage device.

The observation apparatus 400 is configured to measure the slide amount Ds, the slide time Ts, the post-slide contact time Tc, and/or the total contact time Ta, based on the video data provided from the high-speed camera 110.

For example, the observation apparatus 400 may be implemented as any computer such as a personal computer, a server, a tablet, a smartphone, or a dedicated terminal.

The observation apparatus 400 may include, for example, a processing part 410, a storage part 420, a communication part 430, an input part 440, and an output part 450.

The processing part 410 includes, for example, one or more processors such as a central processing unit (CPU). The processing part 410 is configured to execute various programs stored in the storage part 420 to perform various processes and control the overall observation apparatus 400. For example, the processing part 410 is configured to execute an observation program stored in the storage part 420 to measure the slide amount Ds, the slide time Ts, the post-slide contact time Tc, and/or the total contact time Ta. Specific examples of the processes by the processing part 410 will be described later.

The storage part 420 includes, for example, one or more storage devices such as read only memory (ROM) and/or random access memory (RAM). The storage part 420 may be an external storage device (e.g. SD card, USB). The storage part 420 may be internal memory of the processor(s) included in the processing part 410. The storage part 420 stores various programs (e.g. observation program) executed by the processing part 410. The storage part 420 may be also configured to store information generated as a result of the processing part 410 executing various programs.

The communication part 430 includes, for example, one or more communication interfaces. The communication part 430 may be configured to receive video data from the high-speed camera 110 by wire communication or wireless communication. The observation apparatus 400 may not include the communication part 430.

The input part 440 is configured to receive operation from the user. The input part 440 includes, for example, a keyboard, a mouse, a touch panel, buttons, keys, and the like.

The output part 450 is configured to output, to the user, data output from the processing part 410, the storage part 420, the communication part 430, and/or the input part 440. The output part 450 may include, for example, a display or a monitor configured to display text, images, video, etc. For example, the output part 450 can display video data acquired from the high-speed camera 110.

As a first example, the observation apparatus 400 having the structure described above may measure the slide amount Ds, the slide time Ts, the post-slide contact time Tc, and/or the total contact time Ta in the following manner.

After the observation apparatus 400 acquires video data from the high-speed camera 110, first the processing part 410 causes the output part 450 to display a plurality of items of image data included in the video data, to prompt the user to specify at least two times from among the contact time t1, the slide start time t2, the slide stop time t3, and the leaving time t4 based on the plurality of items of image data. The user then specifies image data corresponding to each of the at least two times from among the plurality of items of image data displayed by the output part 450, by operation of the input part 440. The processing part 410 accordingly recognizes that the at least two times are specified.

Following this, the processing part 410 measures the slide amount Ds, the slide time Ts, the post-slide contact time Tc, and/or the total contact time Ta, based on the specified at least two times.

For example, in the case where the slide start time t2 and the slide stop time t3 are specified, the processing part 410 measures the slide amount Ds and/or the slide time Ts. In the measurement of the slide amount Ds, for example, the processing part 410 may prompt the user to specify a predetermined point (e.g. the foregoing point marked with the marker) on the golf ball 140 in each of the image data corresponding to the slide start time t2 and the image data corresponding to the slide stop time t3 by operation of the input part 440, and then measure the distance in the vertical direction between the predetermined point in the image data corresponding to the slide start time t2 and the predetermined point in the image data corresponding to the slide stop time t3. Alternatively, in the measurement of the slide amount Ds, the processing part 410 may automatically specify the predetermined point on the golf ball 140 in each of the image data corresponding to the slide start time t2 and the image data corresponding to the slide stop time t3 by image processing without input from the user, and measure the distance in the vertical direction between the predetermined point in the image data corresponding to the slide start time t2 and the predetermined point in the image data corresponding to the slide stop time t3.

In the case where the slide stop time t3 and the leaving time t4 are specified, the processing part 410 measures the post-slide contact time Tc.

In the case where the contact time t1 and the leaving time t4 are specified, the processing part 410 measures the total contact time Ta.

The processing part 410 may then cause the output part 450 to display the measure value or information relating to the measured value.

As a second example, the observation apparatus 400 having the structure described above may, after acquiring the video data from the high-speed camera 110, automatically measure the slide amount Ds, the slide time Ts, the post-slide contact time Tc, and/or the total contact time Ta based on the video data by image processing, without input from the user.

In the case where the observation system 100 does not include the observation apparatus 400, the user may measure the slide amount Ds, the slide time Ts, the post-slide contact time Tc, and/or the total contact time Ta based on the video data from the high-speed camera 110, while reproducing the video data on any computer.

[Structure of Golf Ball]

The golf ball 140 according to one of the disclosed embodiments may have any structure.

The golf ball 140 according to one of the disclosed embodiments may be any of a one-piece golf ball, a two-piece golf ball, and a multi-piece golf ball having three or more layers (e.g. a three-piece golf ball, a four-piece golf ball, a five-piece golf ball, a six-piece golf ball).

The golf ball 140 according to one of the disclosed embodiments may be any of a solid golf ball and a wound golf ball.

A preferable structure of the golf ball 140 will be described below.

Figure 3:
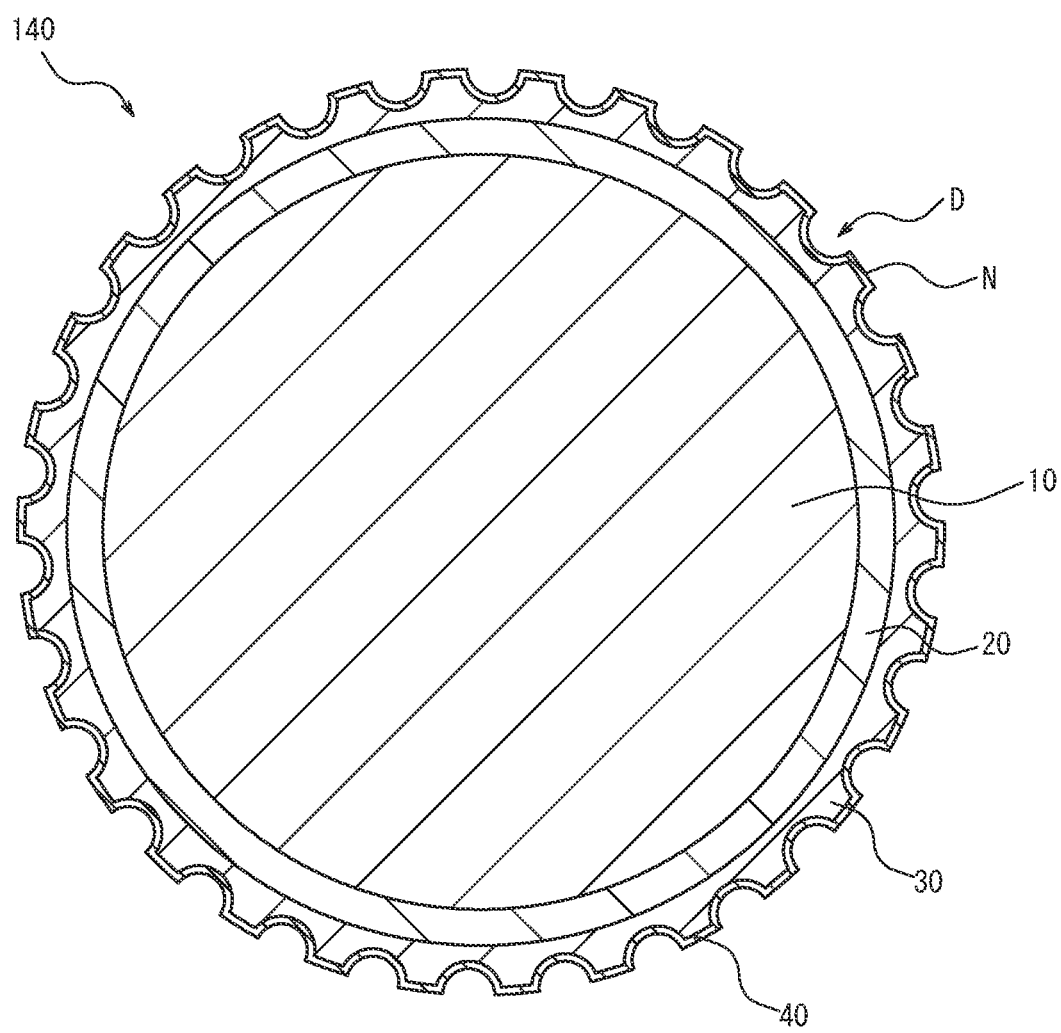
FIG. 3 is a sectional diagram schematically illustrating a golf ball according to one of the disclosed embodiments.

The golf ball 140 according to one of the disclosed embodiments may include a core 10 of one or more layers, as in the example illustrated in FIG. 3.

The core 10 may be formed using a known rubber material as a base material. As the base rubber, a known base rubber such as natural rubber or synthetic rubber may be used, without being limited thereto. More specifically, it is recommended to mainly use polybutadiene, especially cis-1,4-polybutadiene having a cis structure content of at least 40%. The base rubber may contain, in addition to the polybutadiene, natural rubber, polyisoprene rubber, styrene-butadiene rubber, or the like as desired. For example, the polybutadiene may be synthesized with a titanium-based, cobalt-based, nickel-based, or neodymium-based Ziegler catalyst or with a metal catalyst such as cobalt or nickel.

The base rubber may be blended with co-crosslinking agents such as unsaturated carboxylic acid and metal salts thereof, inorganic fillers such as zinc oxide, barium sulfate, and calcium carbonate, organic peroxides such as dicumyl peroxide and 1,1-bis(t-butylperoxy)cyclohexane, and the like. Moreover, commercial age resistors and the like may be optionally added as appropriate.

The golf ball 140 according to one of the disclosed embodiments may further include a cover 30 of one or more layers located on the outer peripheral side of the core 10 of one or more layers, as in the example illustrated in FIG. 3. The golf ball 140 according to one of the disclosed embodiments may further include an intermediate layer 20 of one or more layers located on the outer peripheral side of the core 10 of one or more layers and on the inner peripheral side of the cover 30 of one or more layers.

The intermediate layer 20 and the cover 30 may be, for example, formed using a resin material as a base material. Examples of the resin material that can form the intermediate layer 20 and the cover 30 include ionomer resin, polyester resin, polyamide resin, and polyurethane resin. For example, the intermediate layer 20 may be made of ionomer resin or highly neutralized ionomer resin, and the cover 30 may be made of polyurethane resin.

The material hardness of the cover 30 is preferably 46 or less and more preferably 43 or less in Shore D hardness, from the viewpoint of improving the impact feel.

Herein, "material hardness" is hardness measured using a type D durometer in accordance with ASTM D2240, with the material being stacked to a thickness of 6 mm or more. Herein, "stacking the material to a thickness of 6 mm or more" denotes that, in the case where the member (e.g. cover 30) to be measured is less than 6 mm in thickness, the member is made into a state of a plurality of layers stacked together so that the overall thickness will be 6 mm or more.

The material hardness of the cover 30 may be 30 or more or may be 35 or more in Shore D hardness.

In the case where the golf ball 140 has the cover 30 of a plurality of layers, preferably at least the cover 30 of the outermost layer from among the plurality of layers satisfies the foregoing numeric range, and more preferably the covers 30 of all of the plurality of layers each satisfy the foregoing numeric range.

The golf ball 140 according to one of the disclosed embodiments may further include a paint film 40 located on the outer peripheral side of the cover 30 and covering the cover 30.

The paint film 40 may be formed using, as a main component, urethane paint composed of a polyol that is a main agent and a polyisocyanate that is a curing agent, without being limited thereto.

As the polyol, polyester polyol is preferably used, without being limited thereto. From the viewpoint of improving the impact feel, two types of polyester polyol, i.e. polyester polyol (A) and polyester polyol (B), may be used. In the case of using the two types of polyester polyol, polyester polyol (A) and polyester polyol (B) differ in weight-average molecular weight (Mw). Preferably, the weight-average molecular weight (Mw) of component (A) is 20,000 to 30,000 and the weight-average molecular weight (Mw) of component (B) is 800 to 1,500. The weight-average molecular weight (Mw) of component (A) is more preferably 22,000 to 29,000, and further preferably 23,000 to 28,000.

The weight-average molecular weight (Mw) of component (B) is more preferably 900 to 1,200, and further preferably 1,000 to 1,100.

Polyester polyol is obtained by polycondensation of a polyol with a polybasic acid. Examples of the polyol include diols such as ethylene glycol, propylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol, and polypropylene glycol; triols, tetraols, and polyols having an alicyclic structure. Examples of the polybasic acid include aliphatic dicarboxylic acids such as succinic acid, adipic acid, sebacic acid, azelaic acid, and dimer acid; aliphatic unsaturated dicarboxylic acids such as fumaric acid, maleic acid, itaconic acid, and citraconic acid; aromatic polycarboxylic acids such as phthalic acid, isophthalic acid, terephthalic acid, trimellitic acid, and pyromellitic acid; dicarboxylic acids having an alicyclic structure, such as tetrahydrophthalic acid, hexahydrophthalic acid, 1,3-cyclohexanedicarboxylic acid, 1,4-cyclohexanedicarboxylic acid, and endomethylenetetrahydrophthalic acid; and tris-2-carboxyethyl isocyanurate. In particular, as polyester polyol (A), a polyester polyol having a cyclic structure introduced into a resin skeleton may be used. Examples include polyester polyols obtained by polycondensation of a polyol having an alicyclic structure, such as cyclohexane dimethanol, with a polybasic acid, or by polycondensation of a polyol having an alicyclic structure with a diol or triol and a polybasic acid. As polyester polyol (B), a polyester polyol having a multi-branch structure may be used. Examples include polyester polyols having a branched structure, such as NIPPOLAN 800 available from Tosoh Corporation.

In the case of using the polyester polyol described above, the weight-average molecular weight (Mw) of the whole main agent is preferably 13,000 to 23,000, and more preferably 15,000 to 22,000. The number-average molecular weight (Mn) of the whole main agent is preferably 1,100 to 2,000, and more preferably 1,300 to 1,850. If these average molecular weights (Mw and Mn) are within the foregoing ranges, good wear resistance of the paint film 40 can be maintained. The weight-average molecular weight (Mw) and the number-average molecular weight (Mn) are values (polystyrene equivalent values) measured by gel permeation chromatography (GPC) using a differential refractometer. In the case where the two types of polyester polyol are used, too, the Mw and Mn of the whole main agent are preferably within the foregoing ranges.

The blending amounts of the two types of polyester polyol (A) and (B) are not limited, but it is preferable that the blending amount of component (A) is 20 mass % to 30 mass % with respect to the total amount of the main agent including solvents, and the blending amount of component (B) is 2 mass % to 18 mass % with respect to the total amount of the main agent including solvents.

As the polyisocyanate, commonly used aromatic, aliphatic, alicyclic, and other polyisocyanates may be used, without being limited thereto. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate, and 1-isocyanato-3,3,5-trimethyl-4-isocyanatomethylcyclohexane, and modified products and derivatives thereof. These may be used singly or in mixture.

Examples of modified hexamethylene diisocyanate (HMDI) include polyester-modified hexamethylene diisocyanate and urethane-modified hexamethylene diisocyanate. Examples of derivatives of hexamethylene diisocyanate include isocyanurate forms (nurates), biurets, and adduct forms of hexamethylene diisocyanate. The "adduct form" refers to an adduct of diisocyanate and trimethylolpropane. The "isocyanurate form" refers to a trimer of diisocyanate. In particular, the use of two types of HMDI that are an adduct form excellent in flexibility and an isocyanurate form which is relatively tough can achieve a good impact feel. Examples of isocyanurate forms of HMDI include Coronate 2357 (available from Tosoh Corporation), Sumijour N3300 (available from Sumika Covestrourethane Co., Ltd.), Duranate TPA-100 (available from Asahi Kasei Corporation), Takenate D170N, Takenate D177N (both available from Mitsui Chemicals, Inc.) and Burnock DN-980 (available from DIC, Inc.). Examples of adduct forms of HMDI include Coronate HL (available from Tosoh Corporation), Takenate D160N (available from Mitsui Chemicals, Inc.), Duranate E402-80B, Duranate E405-70B (both available from Asahi Kasei Corporation), and Burnock DN-955, Burnock DN-9555 (both available from DIC, Inc.).

In the paint film 40, the polyisocyanate preferably contains at least one of an isocyanurate form and an adduct form of hexamethylene diisocyanate, from the viewpoint of improving the impact feel.

In the case where the polyisocyanate contains both an adduct form and an isocyanurate form of hexamethylene diisocyanate, the mass ratio (isocyanurate form/adduct form) of the isocyanurate form and the adduct form of hexamethylene diisocyanate is preferably 90/10 to 50/50, from the viewpoint of improving the impact feel.

From the viewpoint of improving the impact feel, it is also preferable that the polyisocyanate contains an adduct form of hexamethylene diisocyanate and does not contain an isocyanurate form of hexamethylene diisocyanate. In this case, the mass ratio (isocyanurate form/adduct form) is 0/100.

In the paint film 40, the polyol that is the main agent and the polyisocyanate that is the curing agent may be mixed with any of various organic solvents depending on the painting conditions. Examples of such organic solvents include aromatic solvents such as toluene, xylene, and ethylbenzene; ester solvents such as ethyl acetate, butyl acetate, propylene glycol methyl ether acetate, and propylene glycol methyl ether propionate; ketone solvents such as acetone, methyl ethyl ketone, methyl isobutyl ketone, and cyclohexanone; ether solvents such as diethylene glycol dimethyl ether, diethylene glycol diethyl ether, and dipropylene glycol dimethyl ether; alicyclic hydrocarbon solvents such as cyclohexane, methyl cyclohexane, and ethyl cyclohexane; and petroleum hydrocarbon solvents such as mineral spirits.

Known paint compounding ingredients may be optionally added to the material forming the paint film 40. Specifically, thickeners, ultraviolet absorbers, fluorescent brighteners, slip agents, and pigments may be added in appropriate amounts.

The thickness of the paint film 40 is preferably 8.0 μm or more, from the viewpoint of improving the impact feel.

The thickness of the paint film 40 may be 12.0 μm or less, or may be 10.0 μm or less.

The thickness of the paint film 40 is measured along a straight line passing through any point on the below-described land portion N of the golf ball 140 and perpendicular to the land portion N.

The golf ball 140 according to one of the disclosed embodiments may have multiple dimples D on its surface, as in the example illustrated in FIG. 3. The part of the surface of the golf ball 140 other than the dimples D is a land portion (also referred to as "bank portion") N.

The number of dimples D is not limited, but is preferably 250 or more, more preferably 300 or more, and further preferably 320 or more, and is preferably 440 or less, more preferably 400 or less, and further preferably 360 or less. If the number of dimples D is not more than the foregoing upper limit, the trajectory of the ball is kept from being lower than necessary, so that a sufficient carry and therefore a sufficient flight distance are easily achieved. If the number of dimples D is not less than the foregoing lower limit, the trajectory of the ball is kept from being higher than necessary, so that a sufficient run and therefore a sufficient flight distance are easily achieved. The arrangement of the dimples D may be symmetric according to a polyhedron such as a tetrahedron, an octahedron, or an icosahedron, or rotational-symmetric about an axis connecting the poles.

Regarding the type of the dimples D, preferably two or more types of dimples D that differ in diameter and/or depth from each other are formed, and more preferably three or more types of dimples D that differ in diameter and/or depth from each other are formed. Examples of the planar shape of the dimples D include a circle, various polygons, a dew drop shape, and other elliptical shapes, which may be used singly or in combination of two or more. For example, in the case of using circular dimples D, the diameter may be about 2.5 mm or more and 6.5 mm or less and the depth may be about 0.07 mm or more and 0.30 mm or less. Examples of the cross-sectional shape of the dimples D include an arc, a cone, a pan bottom, and curves expressed by various functions, which may be used singly or in combination of two or more. A plurality of inflection points may be provided other than in the vicinity of edges.

The dimple surface occupancy ratio SR of the golf ball 140 is preferably 90.0% or less, from the viewpoint of delivering sufficient aerodynamic characteristics. The dimple surface occupancy ratio SR of the golf ball 140 is more preferably 85.0% or less and further preferably 82.8% or less, from the viewpoint of increasing the area of the land portion N and thereby increasing the post-slide contact time Tc and the total contact time Ta to improve the sticky feel and thus the impact feel, and from the viewpoint of improving the spin performance.

The dimple surface occupancy ratio SR of the golf ball 140 is preferably 70.0% or more and more preferably 75.0% or more, from the viewpoint of delivering sufficient aerodynamic characteristics.

The dimple surface occupancy ratio SR (%) of the golf ball 140 refers to the proportion of the total area of the open end surfaces VP (FIG. 4) of the respective dimples D to the area of the virtual spherical surface VS (FIG. 4) of the golf ball 140. The virtual spherical surface VS (FIG. 4) of the golf ball 140 is a spherical surface forming the outline of the golf ball 140 in the case of assuming that the golf ball 140 has no dimple D (i.e. the golf ball 140 is a perfect sphere). The open end surface VP (FIG. 4) of each dimple D is a virtual plane enclosed by the dimple edges E. The dimple edges E are the opening edges of the dimple D, and are ring-shaped edges located at the boundary between the dimple D and the land portion N. In the case where the radial positions (heights) of the dimple edges E are not uniform along the circumferential direction of the dimple edges E, the open end surface VP of the dimple D is defined as being located at the average radial position (average height) of the dimple edges E. Herein, "radial" denotes the radial direction of the golf ball 140 passing through the center of the dimple D. The center of the dimple D refers to a point located at the barycenter of the shape of the dimple D in a planar view of the dimple D from among points on the wall surface of the dimple D.

EXAMPLES

Examples 1 to 5 of the golf ball according to the present disclosure and Comparative Examples 1 to 4 were produced and evaluated. The results will be described below, with reference to Tables 1 to 3. Table 1 indicates the details of each example. Table 2 indicates the formulation of the core of the golf ball in each example. Table 3 indicates the formulation of each of the intermediate layer and the cover of the golf ball in each example. In Table 1, uppercase alphabetic characters A to D in the "Formulation" field of each of the intermediate layer and the cover respectively correspond to formulations A to D in Table 3.

The numbers in the formulations in Tables 1 to 3 are each in parts by mass in a corresponding one of the core, the intermediate layer, the cover, the main agent of the paint film, and the curing agent of the paint film.

In the production of the golf ball in each example, first a rubber composition for a core was prepared according to the formulation in Table 2, and then the rubber composition was vulcanization molded at 152° C. for 19 minutes, to produce a core 10 of 38.65 mm in diameter. After this, the core 10 was coated with an intermediate layer 20 and a cover 30 sequentially in the outward direction by injection molding. Simultaneously with the injection molding, multiple dimples D were formed on the surface of the cover 30. The surface of the cover 30 was then coated with a paint film 40.

In the golf ball in each example, the thickness of the intermediate layer 20 was 1.2 mm, and the thickness of the cover 30 was 0.8 mm.

The slide amount Ds and the post-slide contact time Tc when conducting the foregoing drop test on the golf ball in each example are indicated in Table 1.

(Main Agent of Paint Film 40)

In Examples 1 to 4 and Comparative Examples 1 to 4, as the main agent of the paint film 40, only polyester polyol (A) was dissolved in butyl acetate, as indicated in Table 1. This solution had a nonvolatile content of 27.5 mass %.

In Example 5, as the main agent of the paint film 40, 23 parts by mass of polyester polyol (A) were mixed with 8 parts by mass of polyester polyol (B) (NIPPOLAN 800 available from Tosoh Corporation, solid content: 100%) and an organic solvent, as indicated in Table 1. This mixture had a nonvolatile content of 33.0 mass %.

Polyester polyol (A) was synthesized as follows. First, a reactor equipped with a reflux condenser, a dropping funnel, a gas inlet, and a thermometer was charged with 140 parts by mass of trimethylolpropane, 95 parts by mass of ethylene glycol, 157 parts by mass of adipic acid, and 58 parts by mass of 1,4-cyclohexanedimethanol, the temperature was raised to 200° C. to 240° C. while stirring, and heating (reaction) was performed for 5 hours. This yielded polyester polyol (A) having an acid value of 4, a hydroxyl value of 170, and a weight-average molecular weight (Mw) of 30,000. The synthesized polyester polyol (A) was then dissolved in butyl acetate, thereby preparing a varnish having a nonvolatile content of 70 mass %.

(Curing Agent of Paint Film 40)

In Example 5 and Comparative Example 4, as the polyisocyanate of the curing agent of the paint film 40, Duranate TPA-100 (NCO content: 23.1%, nonvolatile content: 100%) available from Asahi Kasei Corporation, which is an isocyanurate form (nurate) of hexamethylene diisocyanate (HMDI), was used, as indicated in Table 1.

In Example 4 and Comparative Example 3, as the polyisocyanate of the curing agent of the paint film 40, Duranate E402-80B (NCO content: 7.6%, nonvolatile content: 80%) available from Asahi Kasei Corporation, which is an adduct form of hexamethylene diisocyanate (HMDI), was used, as indicated in Table 1.

In Examples 1 to 3 and Comparative Examples 1 to 2, as the polyisocyanate of the curing agent of the paint film 40, the foregoing isocyanurate form of hexamethylene diisocyanate (HMDI) and the foregoing adduct form of hexamethylene diisocyanate (HMDI) were used in mixture, as indicated in Table 1.

The mass ratio (isocyanurate form/adduct form) of the isocyanurate form and the adduct form in each example is indicated in Table 1.

In each example, a solvent was added, and the blending amount (concentration) of the polyisocyanate with respect to the total amount of the curing agent including the solvent was adjusted to the value in Table 1. In each example, the mass ratio (main agent/curing agent) of the main agent and the curing agent of the paint film 40 was 2/1.

(Impact Feel Evaluation)

For the golf ball in each example, the bite feel and the sticky feel were evaluated as follows, for impact feel evaluation.

<Bite Feel>

Function evaluation was conducted by advanced golfers in actual hitting of approach shots with sand wedges (SW), and the bite feel was determined based on the following criteria. The results are indicated in Table 1.

[Criteria]

Excellent: nine or more out of ten golfers evaluated bite feel as good. Satisfactory: six to eight out of ten golfers evaluated bite feel as good. Unsatisfactory: four to five out of ten golfers evaluated bite feel as good.

Poor: three or less out of ten golfers evaluated bite feel as good.

<Sticky Feel>

Function evaluation was conducted by advanced golfers in actual hitting of approach shots with sand wedges (SW), and the sticky feel was determined based on the following criteria. The results are indicated in Table 1.

[Criteria]

Excellent: nine or more out of ten golfers evaluated sticky feel as good.

Satisfactory: six to eight out of ten golfers evaluated sticky feel as good.

Unsatisfactory: four to five out of ten golfers evaluated sticky feel as good.

Poor: three or less out of ten golfers evaluated sticky feel as good.

TABLE 1

| | | | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|---|
| Core | | Formulation | | | | | | Table 2 | | | | |
| Intermediate layer | | Formulation | | A | A | A | A | A | A | A | A | A |
| | | Material hardness (Shore D) | | 64 | 64 | 64 | 64 | 64 | 64 | 64 | 64 | 64 |
| Cover | | Formulation | | B | B | B | B | B | C | D | D | B |
| | | Material hardness (Shore D) | | 43 | 43 | 43 | 43 | 43 | 47 | 60 | 60 | 43 |
| | | Dimple surface occupancy ratio SR (%) | | 82.8 | 82.8 | 82.8 | 82.8 | 82.8 | 82.8 | 85.0 | 85.0 | 82.8 |
| Paint film | Main agent | Formulation | Polyester polyol (A) (molecular weight 30000) | 27.5 | 27.5 | 27.5 | 27.5 | 23.0 | 27.5 | 27.5 | 27.5 | 27.5 |
| | | | Polyester polyol (B) (molecular weight 800 to 1500) | 0.0 | 0.0 | 0.0 | 0.0 | 8.0 | 0.0 | 0.0 | 0.0 | 0.0 |
| | | | Solvent | 72.5 | 72.5 | 72.5 | 72.5 | 69.0 | 72.5 | 72.5 | 72.5 | 72.5 |
| | Curing agent | Formulation | Hexamethylene diisocyanate (HMDI) | 51.5 | 51.5 | 51.5 | 51.5 | 42.0 | 51.5 | 515 | 51.5 | 42.0 |
| | | | Solvent | 48.5 | 48.5 | 48.5 | 48.5 | 58.0 | 48.5 | 48.5 | 48.5 | 58.0 |
| | | Mass ratio of hexamethylene diisocyanate (HMDI) (isocyanurate form/adduct form) | | 90/10 | 80/20 | 50/50 | 0/100 | 100/0 | 80/20 | 80/20 | 0/100 | 100/0 |
| | | Thickness (μm) | | 8.0 | 8.0 | 8.0 | 8.0 | 8.0 | 8.0 | 8.0 | 8.0 | 8.0 |
| | | Slide amount Ds (mm) | | 0.98 | 0.97 | 0.90 | 0.80 | 1.04 | 1.31 | 1.93 | 1.90 | 1.10 |
| | | Post-slide contact time Tc (μs) | | 671 | 636 | 647 | 690 | 634 | 513 | 546 | 574 | 625 |
| Impact feel evaluation | | Bite feel | | Satisfactory | Satisfactory | Satisfactory | Excellent | Satisfactory | Unsatisfactory | Poor | Poor | Unsatisfactory |
| | | Sticky feel | | Satisfactory | Satisfactory | Satisfactory | Excellent | Satisfactory | Unsatisfactory | Unsatisfactory | Unsatisfactory | Satisfactory |

TABLE 2

| Formulation of core | |
|---|---|
| Polybutadiene | 100 |
| Unsaturated carboxylic acid metal salt | 37.4 |
| Peroxide | 1.0 |
| Age resistor | 0.1 |
| Zinc oxide | 14.5 |
| Zinc salt of pentachlorothiophenol | 0.6 |
| Water | 0.6 |

Details on the materials in Table 2 are given below.
Polybutadiene: available under the trade name JSR BR01 from JSR Corporation
Unsaturated carboxylic acid metal salt: zinc acrylate available from Wako Pure Chemical Industries, Ltd.
Peroxide: dicumyl peroxide, available under the trade name Percumyl D from NOF Corporation.
Age resistor: available under the trade name Nocrac NS-6 from Ouchi Shinko Chemical Industrial Co., Ltd.
Zinc oxide: available under the trade name Zinc Oxide Grade 3 from Sakai Chemical Co., Ltd.
Zinc salt of pentachlorothiophenol: available from Wako Pure Chemical Industries, Ltd.
Water: available from Wako Pure Chemical Industries, Ltd.

TABLE 3

| Formulation of intermediate layer and cover | | | | |
|---|---|---|---|---|
|  | A | B | C | D |
| Himilan 1706 | 35 | — | — | — |
| Himilan 1557 | 15 | — | — | — |
| Himilan 1605 | 50 | — | — | 50 |
| Himilan 1601 | — | — | — | 50 |
| TPU1 | — | 100 | — | — |
| TPU2 | — | — | 100 | — |

Details on the materials in Table 3 are given below.
Himilan: ionomer available from DuPont-Mitsui Polychemicals Co., Ltd.
TPU1, TPU2: ether-type thermoplastic polyurethane, available under the trade name Pandex® from DIC Covestro Polymer (Pandex is a registered trademark in Japan, other countries, or both).

As can be understood from the evaluation results in Table 1, the golf ball in each Example improved the bite feel and the sticky feel and thus improved the impact feel as compared with the golf ball in each Comparative Example.

INDUSTRIAL APPLICABILITY

A golf ball according to the present disclosure can be used in any types of golf balls, and is suitable for use in, for example, one-piece golf balls, two-piece golf balls, three-piece golf balls, four-piece golf balls, five-piece golf balls, six-piece golf balls, wound golf balls, etc.

The invention claimed is:
1. A golf ball comprising:
a cover; and
a paint film covering the cover,
wherein the paint film is formed using, as a main component, urethane paint composed of a polyol that is a main agent and a polyisocyanate that is a curing agent,
the polyol is polyester polyol,
the paint film is free of polyrotaxane, and
a slide amount Ds is 1.05 mm or less and a post-slide contact time Tc is 600 µs or more in the case where the golf ball is dropped freely from a height position of 3 m above and away from a collision surface inclined 58 degrees with respect to a horizontal direction to collide with the collision surface, the slide amount Ds being a vertical displacement of the golf ball from when the golf ball starts sliding on the collision surface to when the golf ball stops sliding on the collision surface, and the post-slide contact time Tc being a period from when the golf ball stops sliding on the collision surface to when the golf ball leaves the collision surface.

2. The golf ball according to claim 1,
wherein a material hardness of the cover is 46 or less in Shore D hardness.

3. The golf ball according to claim 1,
wherein
the polyisocyanate contains an isocyanurate form and an adduct form of hexamethylene diisocyanate.

4. The golf ball according to claim 3, wherein a mass ratio of the isocyanurate form and the adduct form of the hexamethylene diisocyanate, expressed as (isocyanurate form)/(adduct form), is 90/10 to 50/50.

5. The golf ball according to claim 1,
wherein a thickness of the paint film is 8.0 µm or more and 12.0 µm or less.

6. The golf ball according to claim 1, comprising
multiple dimples on a surface thereof,
wherein a dimple surface occupancy ratio SR of the golf ball is 85.0% or less.

7. The golf ball according to claim 1, wherein the main agent consists of polyester polyol and solvent.

8. The golf ball according to claim 1, wherein the polyisocyanate contains an adduct form of hexamethylene diisocyanate and is free of an isocyanurate form of hexamethylene diisocyanate.

* * * * *